June 1, 1965 F. D. WALDHAUER 3,187,325

ANALOG-TO-DIGITAL CONVERTER

Filed July 2, 1962 2 Sheets-Sheet 1

INVENTOR
F. D. WALDHAUER
BY [signature]
ATTORNEY

INVENTOR
F. D. WALDHAUER
BY Reg M. Porter, Jr.
ATTORNEY 3,187,325
ANALOG-TO-DIGITAL CONVERTER
Frederick D. Waldhauer, Morris Plains, N.J., assignor to Bell Telephone Laboratories, Incorporated, New York, N.Y., a corporation of New York
Filed July 2, 1962, Ser. No. 206,633
12 Claims. (Cl. 340—347)

This invention relates to digital information processing systems and, more particularly, to systems for translating signal amplitudes into representative reflected-binary code words.

The binary numbering system suggests a particularly convenient method of processing and communicating information. For example, if it is assumed that there are 32 possible "symbols" in a normal written text (the 26 letters plus a space and 5 marks of punctuation), it may easily be shown that each of these 32 symbols might be exclusively represented by a particular group of five binary digits. This follows from the fact that there are 32 different forms in which a group of five "0's" and "1's" might exist. Accordingly, such a written text might be encoded into a binary sequence of "On" and "Off" pulses, transmitted in binary form to a receiving station, and there decoded back into the original written text.

In PCM (pulse code modulation) communication systems, continuous, time-varying "messages," such as electrical speech signals, are also represented by a series of On and Off pulses. In this process, the signal is periodically sampled and binary code words indicative of the amplitude of each of the samples are transmitted. For a thorough exposition of the theory, operation, and advantages of typical PCM systems see, for example, the article "The Philosophy of PCM," by Oliver, Pierce, and Shannon, in volume 36, Proceedings of the IRE, pages 1324 to 1331 (1948); "An Experimental Multichannel PCM System of Toll Quality," by Peterson and Meacham, in volume 27, Bell System Technical Journal, pages 1–43 (1948); and "A Mathematical Theory of Communication," by Shannon also in volume 27 of the Bell System Technical Journal, pages 379–423 and 623–656 (1948). Analog signals encoded in accordance with these typical PCM systems are transmitted in the form of repetitiously occurring groups of pulses, each group representing the amplitude of a particular sample.

In constructing binary code groups to represent the amplitude samples, the significance of the value assigned to each digit is dependent upon its position within the code group. In conventional binary codes each digit is weighted in proportion to $2^{d-1}$ where $d$ is the digit number. Thus, the first significant digit, having a digit number of one, is assigned the value of $2^0$ or 1 when an On pulse appears in that position and zero when an Off pulse appears. Similarly, when the fourth significant digit is an On pulse, it is assigned the value of $2^3$ or eight.

U.S. Patent 2,632,058 which issued to F. Gray on March 17, 1953, describes a coding scheme which offers certain distinct advantages over the more conventional binary code described above. These advantages follow from a particular characteristic of the Gray code, namely, that no two successive numbers differ by more than a single digit. The Gray code had also been termed the "reflected-binary" code due to the manner in which the code is formed.

In the past, several methods have been employed for translating analog signals into their representative binary code words. Examples of these arrangements include (1) counting methods as described, for example, in an article entitled "PCM Equipment," by H. S. Black and J. O. Edson, which appeared in volume 66 of Electrical Engineering, page 1122 (1947); (2) feedback methods such as those disclosed in the article "Coding by Feedback Methods," by B. D. Smith, Proceedings of the IRE, volume 41, number 8 (1953); and (3) coding tube methods as described in the aforementioned article by Meacham and Peterson.

One scheme for forming reflected-binary code groups from analog signals is particularly advantageous and has been termed the "stage-by-stage" encoder. U.S. Patent 3,035,258 which issued to N. E. Chasek on May 15, 1962, describes such a "stage-by-stage" encoder wherein a multiplicity of encoding stages (one for each digit in the code word) are connected in tandem. Each of these stages is provided with an analog input, an analog output, and a digit output. The analog output of the first stage is connected to the analog input of the next, and so on. The stages exhibit a V-shaped transfer characteristic between the analog input and analog output. In the arrangement described by Chasek, conventional full-wave bridge rectifiers are employed in each stage to obtain this characteristic and digit output means responsive to the conductivity state of one of the rectifier diodes are included whereby the polarity of the input signal to each stage may be determined. While the stage-by-stage encoder described in the aforementioned Chasek patent does represent a considerable improvement over other prior art encoders, it does suffer the disadvantages of complexity and limited accuracy.

It is, therefore, an object of the present invention to translate signal amplitudes into their representative reflected-binary code words by means of improved stage-by-stage encoding circuitry.

Further, it is a related object of the present invention to make such a translation in a simplified manner and with greatly increased speed and accuracy.

In a principal aspect, the present invention takes the form of an improved stage-by-stage type encoder which is comprised of a plurality of similar stages connected in cascade. As contemplated by the invention, the desired V-shaped or full-wave rectifier transfer characteristic is developed on a "piece-wise" basis, that is, the two "legs" of the V are generated separated by a novel encoding network and subsequently combined. In accordance with a principal feature of the invention, each half of the desired characteristic is generated by means of of an amplifier which is provided with a feedback path comprising the serially connected combination of a resistance and a nonlinear impedance element. The "analog" output is obtained from the junction of the resistance and the nonlinear element while the digit output is obtained from the output of the amplifier. In a preferred embodiment of the invention, a single amplifier is provided with a pair of dissimilar feedback paths, each of which develops one half of the required transfer characteristic.

A more complete understanding of the present invention may be gained by a consideration of the following description of illustrative embodiments of the invention and the attached drawings. In the drawings, FIGS. 1 through 5 depict the operation of the stage-by-stage encoder on a block diagram, system basis whereas FIGS. 6 through 12 are directed to the improved encoder circuitry contemplated by the present invention. More specifically, FIG. 1 illustrates in simple block form a single encoding stage which is typical of the type employed in the stage-by-stage encoder;

FIG. 2 graphically illustrates the digit output transfer characteristic of the encoding stage shown in FIG. 1;

Figure 10:
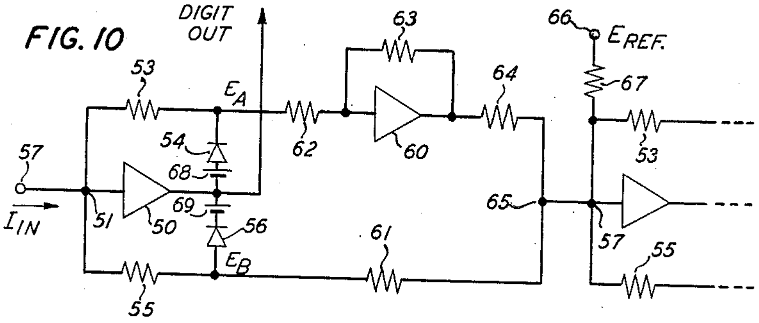
Figure 11:
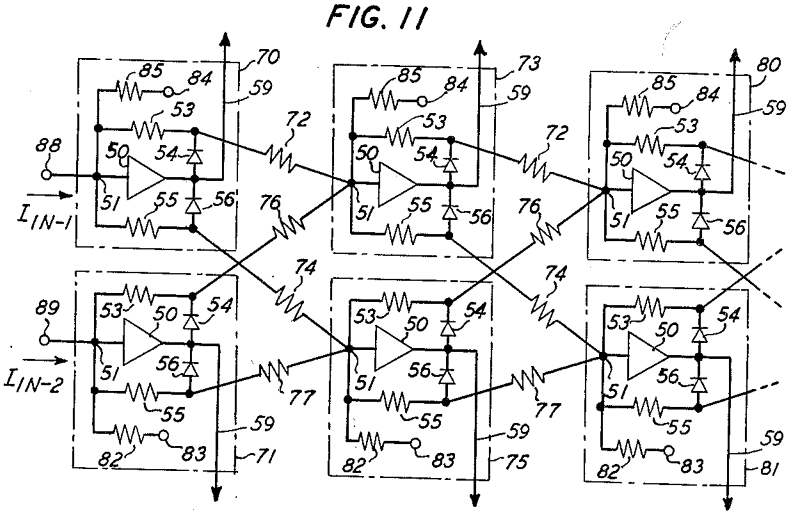
Figure 12:
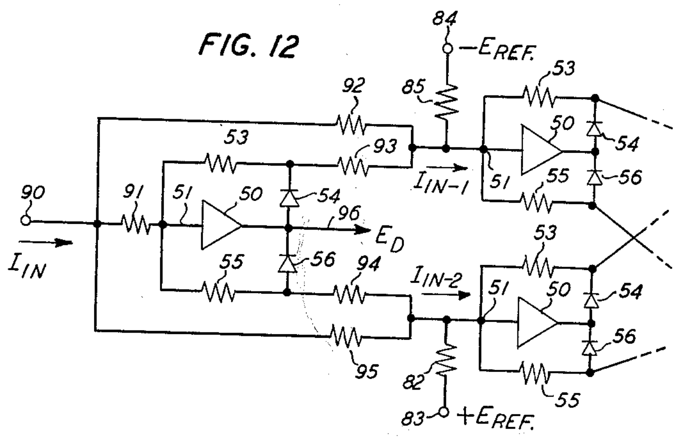

FIG. 10 schematically illustrates a complete encoding stage of the type contemplated by one embodiment of the present invention;

FIG. 11 shows three stages of a balanced encoding system of the type employed in a preferred embodiment of the invention; and FIG. 12 illustrates a "polarity extractor" stage which may be used to drive the balanced encoder pictured in FIG. 11.

Figure 1:
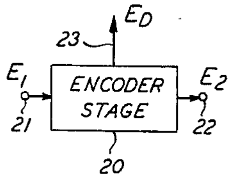

In drawings, FIG. 1 shows in simple block form the principal input and output connections of a single stage 20 of the type used in the stage-by-stage encoder. The stage 20 is provided with an input 21, a "residue" output 22, and a digit output 23. For illustrative purposes, the voltage applied to the input 21 will be designated $E_1$, the voltage delivered to the residue output 22 will be referred to as $E_2$, and the voltage applied to the digit output will be termed $E_D$.

Figure 2:
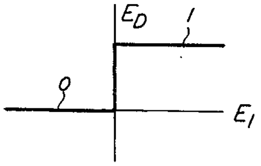

FIG. 2 illustrates the idealized, digit output transfer characteristic of the single stage shown in FIG. 1. Note that, for all negative values of the input voltage $E_1$, the digit output delivers a "0" voltage and, for all positive input voltages, the digit output delivers a nominal positive voltage indicative of a "1."

Figure 3:
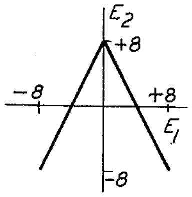
FIG. 3 depicts the "residue" output characteristic of the encoding stage shown by FIG. 1.

FIG. 3 is a graphical representation of the "residue output voltage vs. input voltage" characteristics. It may be seen that the entire transfer characteristic lies within a range of sixteen volts on both the abscissa and the ordinate. The graph of FIG. 3 has been scaled in this manner merely for convenience since, in the description below, a four-digit code generator will be described. It may also be noted that the residue output voltage $E_2$ is always equal to the arbitrary value 8 volts minus twice the absolute magnitude of the input voltage $E_1$, that is, it is the "residue" remaining after twice the input voltage has been subtracted from the 8 volt reference potential.

Figure 4:
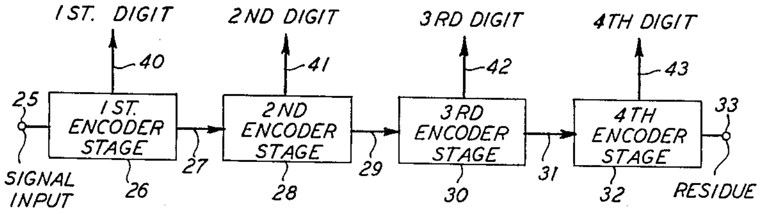
FIG. 4 illustrates in block form a four-digit stage-by-stage encoder.

FIG. 4 is a schematic diagram of a four-digit stage-by-stage encoder which employs stages of the type whose operation is depicted by FIGS. 1 through 3. The encoder is provided with a signal input terminal 25 which comprises the input terminal to the first stage 26. Conductor 27 connects the residue output of stage 26 to the input of stage 28. Similarly, conductor 29 connects stages 28 and 30 while conductor 31 connects stages 30 and 32. The residue output from stage 32 is designated as terminal 33. The digit outputs of stages 26, 28, 30 and 32 are labeled as conductors 40, 41, 42, 43 respectively.

In operation, an analog signal which is to be encoded into the reflected-binary code is obtained from an available source and applied to signal input terminal 25. This signal will be constrained to exist within a predetermined range of values. In the example given here, it may be assumed that the input signal will at all times be greater than $-8$ volts but less than $+8$ volts. This range of values corresponds to the scale chosen for the abscissa of the graph pictured in FIG. 3.

Figure 5:
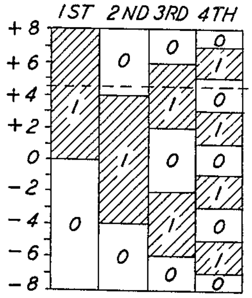
FIG. 5 shows the manner in which a four-digit code group of the type generated by the encoder of FIG. 4 may be employed to represent the instantaneous amplitude of an analog signal.

At this point it will be helpful to refer briefly to the diagram shown in FIG. 5. This diagram illustrates the manner in which a four-digit reflected-binary code group may be employed to designate various levels of input signal amplitude. Since a four digit code group is employed, any one of $2^4$ or 16 quantized levels may be exclusively designated by the code. To determine the nature of the reflected-binary representation of any given number between $-8$ and $+8$, merely find the decimal number on scale at the left and then sight across the diagram from left to right reading off the four digits. Thus, the number $+4.6$ falls within the level designated by the code group 1010 as shown by the horizontal broken line on the diagram of FIG. 5.

To illustrate the operation of the stage-by-stage encoder shown in FIG. 4, let it be assumed that the instantaneous amplitude of the analog signal applied to input terminal 25 is 4.6 volts. From the graph of FIG. 2 it will be immediately noticed that the first digit output conductor 40 receives a voltage representing a "1" since the input voltage applied to stage 26 is positive. From FIG. 3, the residue voltage from stage 26 may be seen to be $8 -2(4.6)$ volts or $-1.2$ volts. This voltage is applied to the input of stage 28 by means of conductor 27. Since the input to stage 28 is therefore negative, the second digit output 41 receives a "0." Again noting the graph of FIG. 3, it may be seen that the voltage delivered to conductor 29 is equal to $8 -2(1.2)$ or $+5.6$ volts. Accordingly, stage 30 delivers a "1" to the third digit output 42 and a residue voltage equal to $-3.2$ volts is delivered to the input of stage 32 by conductor 31. Digit output conductor 43 therefore receives a "0" indication as the fourth and final digit, such that the appropriate reflected-binary number 1010 appears at the four digit outputs, 40 through 43. A residue voltage of 1.6 volts is delivered to terminal 33. It will be appreciated that additional stages might be connected to terminal 33 to provide an increased number of output digits in exactly the same manner, thereby still further improving the precision of amplitude designation.

The present invention provides improved circuit means for realizing the stage-by-stage encoding process described above. The nonlinear encoding network pictured in FIG. 6 of the drawings represents a specific embodiment of a novel "building-block" circuit which may be employed in accordance with the invention with other, similar networks to form the encoder. The nonlinear network comprises an amplifier 50 having a ground connection 49, an input 51 and an output 52. A first resistance 53 and a first diode 54 are connected in series between input 51 and output 52, diode 54 being poled in the direction of positive current flow from output 52 to input 51. A similar series connection comprising a second resistance 55 and a diode 56 is also provided between output 52 and input 51, diode 56 being poled to conduct positive current from input 51 to output 52. The network is provided with a network input terminal 57 which is directly connected to amplifier input 51. The input current to the network, which is obtained from an available source, will hereinafter be referred to as $I_{in}$. The network is also provided with three output terminals. The first of these, terminal 58, is directly connected to the junction of resistance 53 and diode 54. The second output terminal is directly connected to amplifier output 52 and is designated terminal 59. A third output terminal 60 is connected to the junction of resistance 55 and diode 56. Output voltages $E_A$, $E_D$, and $E_B$ appear at the first, second and third output terminals respectively. Each of these output voltages is taken with respect to the voltage at input 51.

Figure 6:
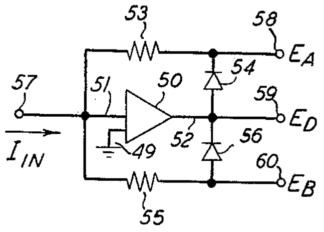
FIG. 6 illustrates a novel nonlinear encoding network which is employed in the present invention.

The input 51 of amplifier 50 is at substantially ground potential. This results from the fact that amplifier 50 has both a high current gain and a high voltage gain. Accordingly, when the voltage at the amplifier output 52 is finite, the potential at input 51 is negligible. Likewise, with finite amplifier output current, the input current (exclusive of feedback path currents) is also negligible. In order to more clearly understand this important operational feature of the "building-block" network shown in FIG. 6, is may be helpful to consider the amplifier 50 as being a differential amplifier which is provided with an additional grounded "input" connection 49. The voltage delivered to the output 52 is then equal to the difference between ground and the actual potential of input 51 times the very high gain of the amplifier. If the amplifier output voltage, $E_D$, is not unreasonably large, it follows that the aforementioned difference voltage must be very small indeed. The fact that amplifier input 51 is substantially at ground potential should be borne in mind while considering the description to follow.

The amplifier 50 includes one net phase reversal. Thus, when the current $I_{in}$ is positive (flowing toward input 51), the output 52 of amplifier 50 is negative and diode 54 is back-biased. In this condition, no current flows through resistance 53 and, as shown on the graph of FIG. 7, the voltage $E_A$ is zero. When $I_{in}$ is negative, however, the output 52 of amplifier 50 is positive, diode 54 becomes forward biased, and a positive voltage $E_A$ appears at output terminal 58. Since diode 56 will be back-biased for negative input currents and since, due to amplifier 50's high current gain, negligible currents flow through input 51, essentially all of the input current $I_{in}$ flows through resistance 53. As shown on FIG. 7, therefore, as the magnitude of the negative current $I_{in}$ increases, the magnitude of the voltage $E_A$ rises in a linear manner. The relationship between the voltage $E_B$ and the current $I_{in}$ is explainable by a similar process and is plotted on the graph of FIG. 8.

Figure 9:
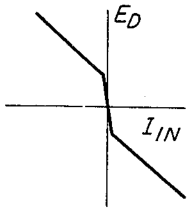
FIG. 9 depicts the digit output transfer characteristic of the network illustrated in FIG. 6.

The voltage $E_D$ at terminal 59 represents the sum of voltages $E_A$ and $E_B$ plus the forward voltage drop of the conducting diode. These forward voltages, which are on the order of .7 volt for silicon diodes, cause the voltage jump at zero input current as shown in FIG. 9. The magnitude of this jump is twice the diode forward voltage.

Figure 7:
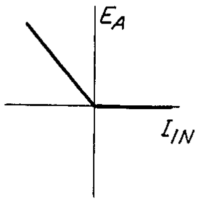
FIG. 7 is a graphical representation of a first output characteristic of the network shown in FIG. 6.
Figure 8:
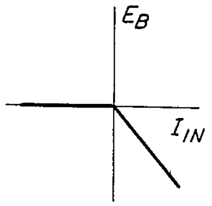
FIG. 8 shows a second output characteristic of the network shown in FIG. 6.

Again noting FIGS. 2 and 3 of the drawings, it will be remembered that each stage of the stage-by-stage encoder is required to develop first and second output functions. The first of these, pictured in FIG. 2, is the "digit output" function and is characterized by a jump from one digit output voltage level to another at a predetermined magnitude of the electrical input quantity. In FIG. 6, the voltage $E_D$ which is developed at the output of amplifier 50 may be used to provide this function. The second output function is termed the "residue output characteristic" and is shown by FIG. 3. It may be noted that if the voltage $E_A$ as plotted in FIG. 7 is subtracted from the voltage $E_B$ pictured in FIG. 8, the result would be an inverted V-shaped characteristic of the type shown in FIG. 3 although the apex of the V would be at zero instead of at some positive value.

The encoding stage illustrated by FIG. 10 of the drawings represents a first method of employing the encoding network of FIG. 6 to provide the required transfer characteristic. This encoding stage includes, in addition to a network similar to that of FIG. 6, an inverting amplifier 60 and coupling resistances 61 through 64. The voltage $E_B$ is obtained as before, from the junction of diode 56 and resistance 55 and causes a precisely derived current to flow from a summing node 65 through the coupling resistance 61. Amplifier 60 is interconnected with resistances 62, 63 and 64 such that the voltage EA is inverted in polarity thereby developing a current which appropriately combines with the current developed by voltage $E_B$ to provide the desired "inverted V" transfer characteristic. These two currents are combined at the summing node point 65 which is directly connected to the input 57 of the next stage. An additional current flows from terminal 66 through resistance 67 to the summing node 65. This current is obtained from a source of reference potential which applies the voltage $E_{REF.}$ to terminal 66. This additional current allows the apex of the inverted V characteristic to be positioned at the appropriate position on the ordinate.

It may be noted that the "building-block" network employed in the encoder stage shown in FIG. 10 has been modified from that pictured in FIG. 6 by the inclusion of two small biasing sources 68 and 69. These two sources, which are shown as batteries serially connected with diodes 54 and 56 respectively, apply a forward biasing voltage to each of the two diodes which is approximately one-half of the forward voltage drop of a conducting diode. By compensating for the forward voltage drop in this manner, the voltage across resistances 53 and 54 becomes even more precisely related to the magnitude of the input signal. The additional compensating bias also allows the amplifier output to switch more rapidly from one polarity to another by decreasing the size of the voltage jump described earlier in conjunction with FIG. 9 of the drawings.

The scheme for combining coding networks which is pictured in FIG. 10 has been found to work quite satisfactorily. For extremely high speed systems, however, the additional tandem amplifier reduces the coding speed somewhat. Furthermore, the propagation time is different for signals following the two separate paths. The embodiment of the present invention which is schematically illustrated in FIG. 11 circumvents the difficulties encountered in these high-speed applications. A balanced encoder of the type pictured in FIG. 11 has been experimentally found to be capable of translating an analog signal into a digital PCM signal at extremely high pulse rates in excess with an accuracy of 1 part in 5,000.

As shown in FIG. 11, each "stage" of the balanced encoder is made up of two networks, each of the type discussed earlier in conjunction with FIG. 6. These networks operate in phase opposition, that is, when the output of one amplifier is positive, the output of its complementary amplifier in the same stage is negative.

FIG. 11 shows three encoding stages connected in tandem. The first stage comprises networks 70 and 71 which are driven in phase opposition by the balanced input signals $I_{IN-1}$ and $I_{IN-2}$ respectively. Each of the networks is similar to that pictured in FIG. 6 and like reference numerals have been used to refer to those elements common to the two figures. The junction of resistance 53 and diode 54 of network 70 is connected by means of resistance 72 to the amplifier input 51 of network 73. Resistance 74 connects the input of network 75 to the junction of diode 56 and resistance 55 of network 70. In a like manner, resistance 76 connects the input of network 73 to the junction of resistance 53 and diode 54 in network 71, while resistance 77 connects the junction of diode 56 and resistance 55 in network 71 to the input of network 75.

The networks 73 and 75 of the second stage of the encoder illustrated by FIG. 11 are interconnected with the networks 80 and 81 of the third stage by a similar configuration of coupling resistances 72, 74, 76 and 77. Each of the networks 71, 75, and 81 is provided with a resistance 82 connected in each case between a reference voltage input terminal 83 and amplifier input 51. A positive voltage from an available source is applied to terminal 83. The networks 70, 73 and 80 are each provided with a negative reference voltage supply comprising terminal 84 and resistance 85.

The arrangement of FIG. 11 is provided with a pair of input terminals 88 and 89 which are directly connected to the amplifier inputs 51 in stages 70 and 71 respectively. In operation, balanced signals $I_{IN-1}$ and $I_{IN-2}$ should be applied to these two inputs. Signals $I_{IN-1}$ and $I_{IN-2}$ may be derived by means of any one of several well known types of phase inverters or, alternately, by means of a special first stage such as that illustrated by FIG. 12. This initial stage performs two functions. It delivers the appropriate balanced signals to the two inputs of the second stage of the encoder and also generates the first digit of the code group. Since this first digit commonly indicates the polarity of the signal to be encoded (while the remaining digits represent the signal's magnitude), it has been termed a "polarity extractor" stage.

The polarity extractor comprises, in addition to the basic network discussed in conjunction with FIG. 6, an input terminal 90, a resistance 91 connected between terminal 90 and amplifier input 51 of the network, the series combination of resistances 92 and 93 connected between terminal 90 and the junction of resistance 53 and diode 54, and the series combination of resistances 94 and 95 connected between the terminal 90 and the junction of resistance 55 and diode 56. The junction of resistances 92 and 93 forms the first output of the polarity extractor and delivers the current $I_{IN-1}$ to one of the networks of the second stage. Current $I_{IN-2}$ is obtained from the junction of resistances 94 and 95. FIG. 12 also illustrates the manner in which these balanced currents are applied to the first stage of an encoder of the type shown in FIG. 11.

In order to obtain the desired inverted V transfer characteristic for the polarity extractor, the values of the interconnected resistances should be selected in accordance with the following relation:

$$\frac{R_f}{2R_L}=\frac{R_g}{R_c}$$

where resistances 53 and 55 have the value $R_f$, resistances 93 and 94 the value $R_L$, resistances 92 and 95 the value $R_c$, and resistance 91 has the value $R_g$.

In operation, the analog signal to be encoded is applied to input terminal 90 of the polarity extractor stage shown in FIG. 12. The digit output terminal 96 delivers a signal indicative of the polarity of the analog input signal. The two balanced output currents $I_{IN-1}$ and $I_{IN-2}$ obtained from the polarity extractor stage are then applied to the balanced encoder shown in FIG. 11. It may be noted that there are two digit outputs 59 per stage (one from each network) within the balanced encoder. These two outputs deliver the same digital information although in phase opposition. It should be noted also that additional compensating bias sources, such as the batteries 68 and 69 discussed in conjunction with FIG. 10, may be added to the arrangements of FIGS. 11 and 12.

It will, of course, be obvious to those skilled in the art that many variations of the encoder schemes hereinbefore described are possible. The circuitry may be extended, for example, to be capable of encoding an analog signal into any desired number of digits. Polarities, element values, the manner of interconnecting the stages, as well as the configuration of the stages themselves, may be modified in many ways without departing from the true spirit and scope of the invention.

What is claimed is:

1. An encoding stage for a stage-by-stage encoder which comprises, in combination, analog input, analog output, and digit output connections for said stage, at least a first circuit path including the series combination of a resistance and a unidirectional conducting device connected between said analog input and said digit output, circuit means connecting the junction of said resistance and said unidirectional conducting device to said analog output, and amplifying means connected to insure that any voltage existing across said device which is of the proper polarity to forward-bias said unidirectional conducting device will be of sufficient magnitude to cause conduction therethrough.

2. In a stage-by-stage encoding system wherein a plurality of similar encoding stages are connected in tandem each of said stages having an analog input, an analog output, and a digit output, improved stage circuitry comprising first, second and third parallel circuit paths connected between said analog input and said digit output, said first and said second paths comprising the series combination of a diode and a resistance, said third path comprising an amplifier, means for obtaining a first signal from the junction of said resistance and said diode in said first path, means for obtaining a second signal from the junction of said resistance and said diode in said second path, means for combining said first and said second signals to form a third signal and means for applying said third signal to said analog output of said stage.

3. In a stage-by-stage encoder wherein a plurality of encoding stages are connected in tandem, each of said stages having an analog input, an analog output and a digit output, improved stage circuitry comprising, in combination, an amplifier having an input and an output, a unidirectional conducting device connected between said amplifier output and said analog output of said stage, a resistance connected between said amplifier input and said analog output of said stage, circuit means for connecting said digit output of said stage to said amplifier output, and means for connecting said amplifier input to said analog input of said stage.

4. In a stage-by-stage encoding arrangement wherein a plurality of stages are connected in tandem, each of said stages having an analog input, an analog output and a digit output and each delivering a signal to the said analog output which has an amplitude directly related to the absolute magnitude of the signal applied to said analog input, improved stage circuitry which comprises, in combination, an amplifier having an input and an output, at least a first feedback path connected between said amplifier input and said amplifier output, nonlinear impedance means connected within said feedback path for providing an effective emplifier gain whose magnitude is dependent upon the magnitude of the signal applied to said amplifier input, circuit means for said analog input of said stage to said amplifier input, means connecting said amplifier output to said digit output, and means connecting said analog input of said stage to one terminal of said nonlinear impedance means.

5. Improved stage circuitry for a stage-by-stage type encoder which comprises, in combination, a pair of similar networks each comprising an amplifier which is provided with first and second feedback paths including an asymmetrical conducting device, input means for applying balanced signals to the inputs of said amplifiers in said pair of networks, digit output means connected to the output of said amplifiers, and means for combining signals of the first path of one of said networks with signals from the second path of the other of said networks to provide an output signal.

6. Means for translating the instantaneous amplitude of an analog signal into a group of binary code digits representative of said amplitude which comprises, in combination with a source of said analog signal, at least first and second amplifiers each having an input and an output, at least one feedback path including the series combination of a resistance and a nonlinear impedance element connected between the input and output of said first amplifier, circuit means connecting the input of said second amplifier to the junction of said resistance and said nonlinear impedance element, and digit output means connected to the outputs of said first and said second amplifiers.

7. An encoder which comprises, in combination, a plurality of like networks each comprising an amplifier having an input and an output, a resistance and a unidirectional conducting device connected in series between said input and said output, digit output means connected to the output of said amplifier, and analog output means connected to the junction of said resistance and said unidirectional conducting means, circuit means for connecting said networks in a tandem configuration, said analog output means in one network being connected to the amplifier input in the next network in said tandem configuration of networks, a source of an analog signal connected to the amplifier input in the first network in said tandem configuration of networks, and means including the said digit output means of said plurality of networks for delivering a group of digital signals indicative of the amplitude of said analog signal.

8. In a stage-by-stage binary encoder wherein a plurality of like encoder stages are connected in tandem, each of said stages having an analog input, an analog output, a digit output and each being characterized in that the transfer function between said analog input and said analog output is substantially that of a full-wave rectifier, improved stage circuitry which comprises, in combination, an amplifier having an input and an output, circuit means connecting said stage input to said amplifier input, first and second dissimilar feedback paths connected between said amplifier input and said amplifier output, each of said paths including the series combination of a resistance and a unidirectional conducting device, means for obtaining a first electrical quantity from the junction of said resistance and said unidirectional conducting device in said first path, means for obtaining a second electrical quantity from the junction of said resistance and said unidirectional conducting device in said second path, means for subtracting said first electrical quantity from said second electrical quantity and for applying the result to said analog output of said stage, and means responsive to the conductivity states of said unidirectional conducting devices for delivering a digit signal to said digit output.

9. In a stage-by-stage binary encoder wherein a plurality of like encoder stages are connected in tandem, each of said stages having an analog input, an analog output and a digit output and each being characterized in that the transfer function between said analog input and said analog output is substantially that of a full-wave rectifier, improved encoder stage circuitry which comprises, in combination, an amplifier having an input and an output, stage input means connected to the input of said amplifier, a first resistance and a first diode connected in series between said input and said output, a second resistance and a second diode connected in series between said input and said output, said first and said second diodes being polarized such that only one of the two is substantially conducting at any given time, means for combining the signal existing at the junction of said first resistance and said first diode with the signal existing at the junction of said second resistance and said second diode and for applying the result to the analog output of said stage, and means responsive to the conductivity state of said diodes for delivering a digit signal to said digit output of said stage.

10. In combination, first, second and third networks each comprising an amplifier, an input circuit for said amplifier, an output circuit for said amplifier, a first resistance and a first diode serially connected between said input circuit and said output circuit, and a second resistance and a second diode serially connected between said input circuit and said output circuit, and means for interconnecting said first, second and third networks which includes circuit means for connecting said input circuit in said second network to the junction of said first resistance and said first diode in said first network, and circuit means for connecting said input circuit in said third network to the junction of said second resistance and said second diode in said first network.

11. In combination with apparatus as defined in claim 10, a source of an analog signal, means for applying said signal to said input circuit in said first network, and digit output means connected to the output circuits in said first and said second networks.

12. In combination, an amplifier having an input and an output and having a gain substantially greater than unity, a source of an analog signal connected to said input, first and second parallel feedback paths connected between said input and said output, each of said paths including the series combination of a resistor and a diode, said diode in said first path being poled to conduct positive current from said input to said output, said diode in said second path being poled to conduct positive current from said output to said input, means for deriving a first subsignal from the voltage existing across the resistance in said first path, means for deriving a second subsignal from the voltage existing across the resistance in said second path, means for inverting the polarity of one of said subsignals, and means for combining the inverted subsignal with the other of said subsignals to form an output signal having an amplitude which is accurately related to the absolute magnitude of said analog signal.

References Cited by the Examiner

UNITED STATES PATENTS

| | | | |
|---|---|---|---|
| 2,958,832 | 11/60 | Clark | 330—110 X |
| 3,035,258 | 5/62 | Chasek | 340—347 |

FOREIGN PATENTS

| | | |
|---|---|---|
| 564,681 | 8/58 | Belgium. |

MALCOLM A. MORRISON, *Primary Examiner.*